(12) United States Patent
Looijen et al.

(10) Patent No.: US 11,939,831 B2
(45) Date of Patent: Mar. 26, 2024

(54) DEVICE, SYSTEM AND METHOD FOR COLLECTING SAMPLES FROM A BED OF A WATERBODY

(71) Applicant: FNV IP B.V., Leidschendam (NL)

(72) Inventors: Peter Nicolaas Looijen, Leidschendam (NL); Jamshid James Gharib, Leidschendam (NL)

(73) Assignee: FNV IP B.V., Leidschendam (NL)

( * ) Notice: Subject to any disclaimer, the term of this patent is extended or adjusted under 35 U.S.C. 154(b) by 749 days.

(21) Appl. No.: 17/046,697

(22) PCT Filed: Apr. 12, 2019

(86) PCT No.: PCT/NL2019/050219
§ 371 (c)(1),
(2) Date: Oct. 9, 2020

(87) PCT Pub. No.: WO2019/199171
PCT Pub. Date: Oct. 17, 2019

(65) Prior Publication Data
US 2021/0140258 A1    May 13, 2021

(30) Foreign Application Priority Data
Apr. 13, 2018 (NL) .................. 2020764

(51) Int. Cl.
*E21B 25/18* (2006.01)
*B63B 21/20* (2006.01)
(Continued)

(52) U.S. Cl.
CPC .............. *E21B 25/18* (2013.01); *B63B 21/20* (2013.01); *E21B 49/025* (2013.01); *G01N 1/08* (2013.01)

(58) Field of Classification Search
CPC ....... E21B 25/18; E21B 49/025; B63B 21/20; B63B 27/08; G01N 1/08
See application file for complete search history.

(56) References Cited

U.S. PATENT DOCUMENTS 3,477,525 A    11/1969 Farrell et al.
8,994,527 B2 *    3/2015 Verhulst .................. G01N 1/08
                                                    367/24
(Continued)

FOREIGN PATENT DOCUMENTS

CA    2689489 A1    6/2011
CN    106441995 A   2/2017
(Continued)

OTHER PUBLICATIONS

International Search Report and Written Opinion; PCT Application No. PCT/NL2019/050219; dated Aug. 21, 2019.
(Continued)

*Primary Examiner* — Suman K Nath
(74) *Attorney, Agent, or Firm* — Polsinelli PC

(57) ABSTRACT

A pin point corer for collecting samples from a seabed of a sea, having a control unit to be positioned on a vessel or similar remote position, a top lift unit, which can be attached to a lifting and lowering unit of a vessel via an cable, such that it can be lifted and lowered relative to the seabed, a corer unit, releasable attached to the top lift unit by a fixation unit and arranged for being at least partly driven into layers of the seabed to collect the samples from there, e.g. when released from the top lift unit, wherein the top lift unit comprises a positioning unit bi-directionally communicating with the control unit for controlling the position of the corer unit. The invention also relates to a respective system and a method for collecting samples by use of such a pin point corer.

19 Claims, 16 Drawing Sheets

Figure 1:
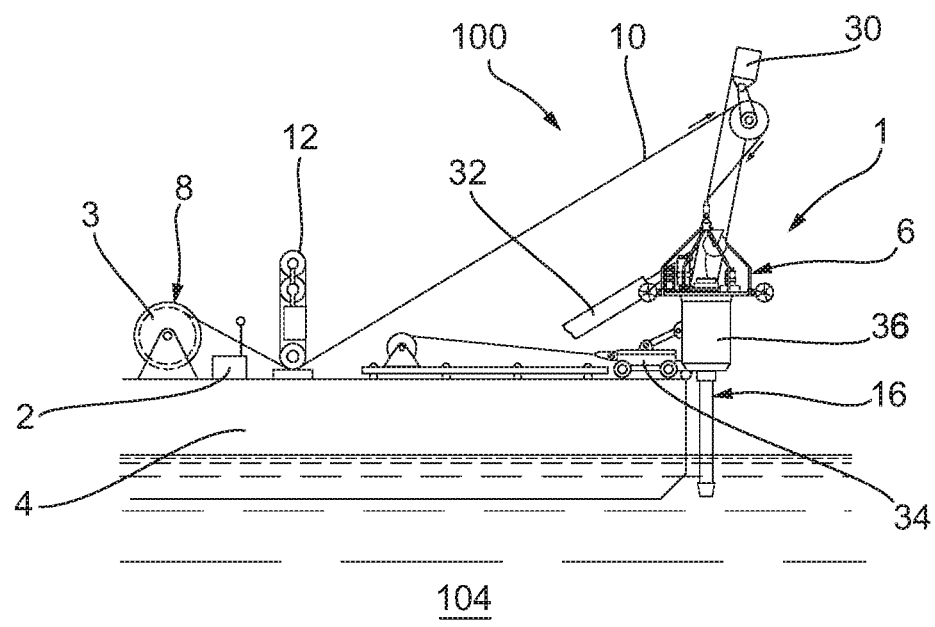

(51) Int. Cl.
  *E21B 49/02* (2006.01)
  *G01N 1/08* (2006.01)

(56) References Cited

U.S. PATENT DOCUMENTS

2015/0337611 A1 11/2015 Looijen
2020/0131853 A1* 4/2020 Wan ..................... E21B 21/001

FOREIGN PATENT DOCUMENTS

| JP | 58138835 A | 8/1983 |
| JP | 2013242265 A | 12/2013 |
| WO | 2011072342 A1 | 6/2011 |
| WO | 2019199171 A1 | 10/2019 |

OTHER PUBLICATIONS

English abstract of JP2013242265; retreived from www.espacenet.com on Oct. 9, 2020.
English abstract of CN106441995; retreived from www.espacenet.com on Oct. 9, 2020.
English abstract of JP58138835; retreived from www.espacenet.com on Oct. 9, 2020.

* cited by examiner

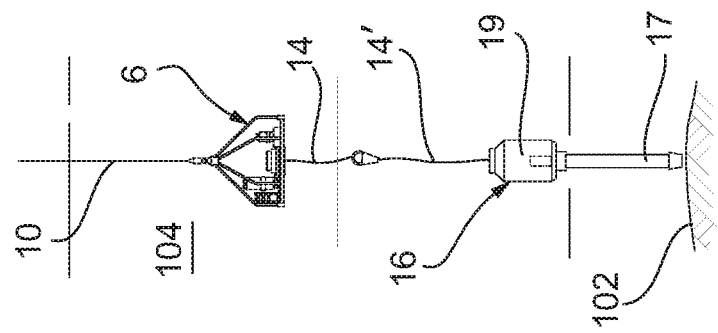
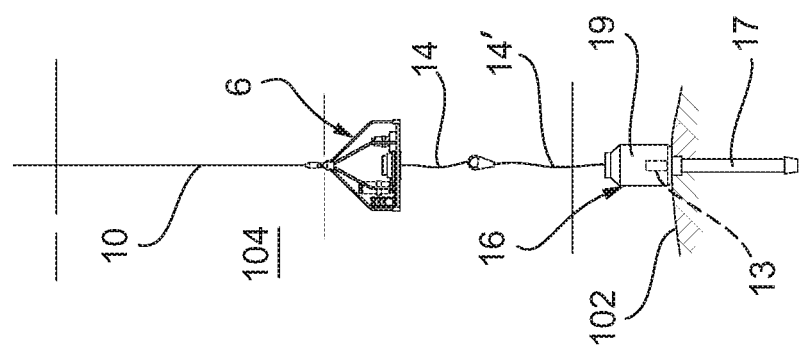
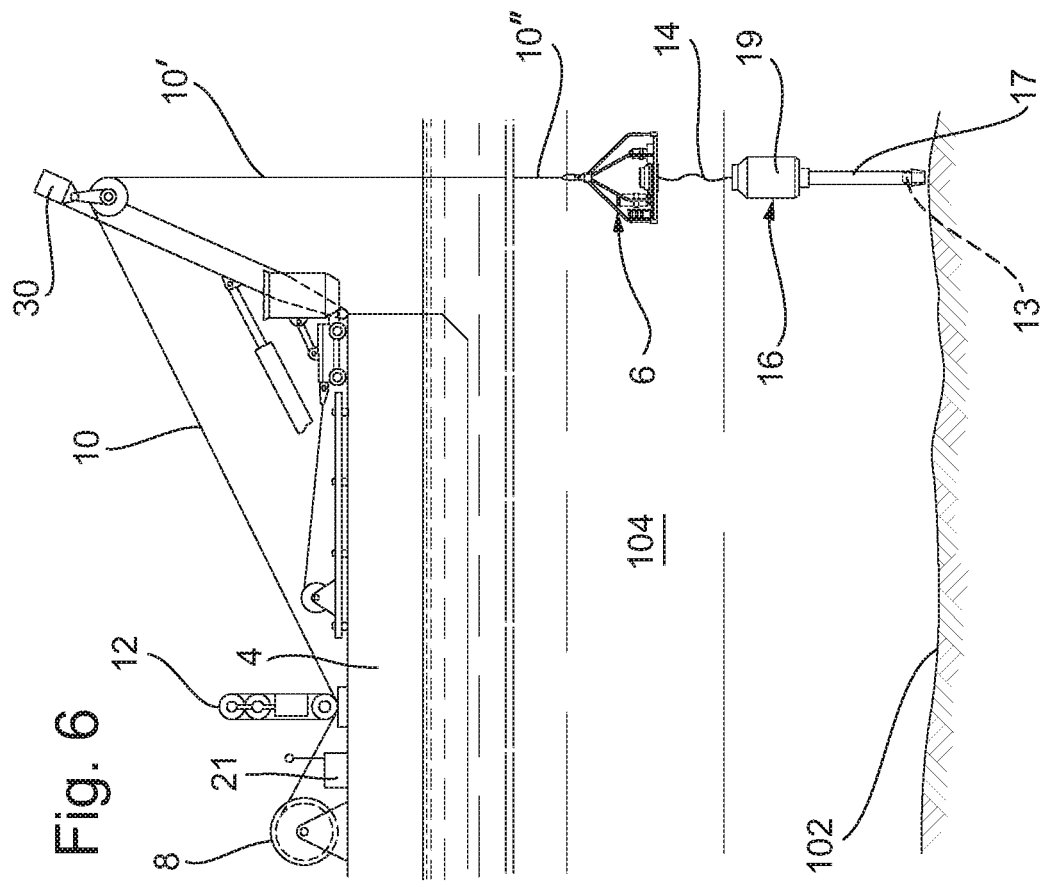

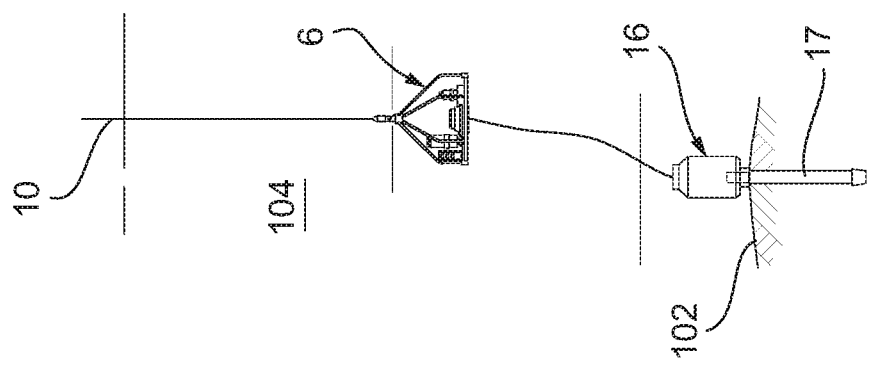
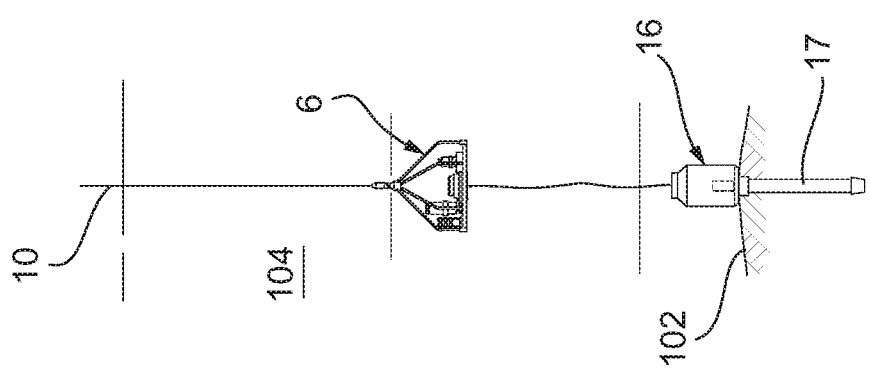
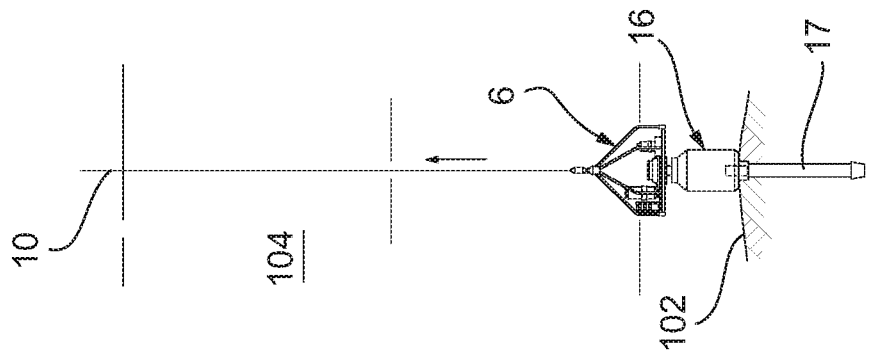

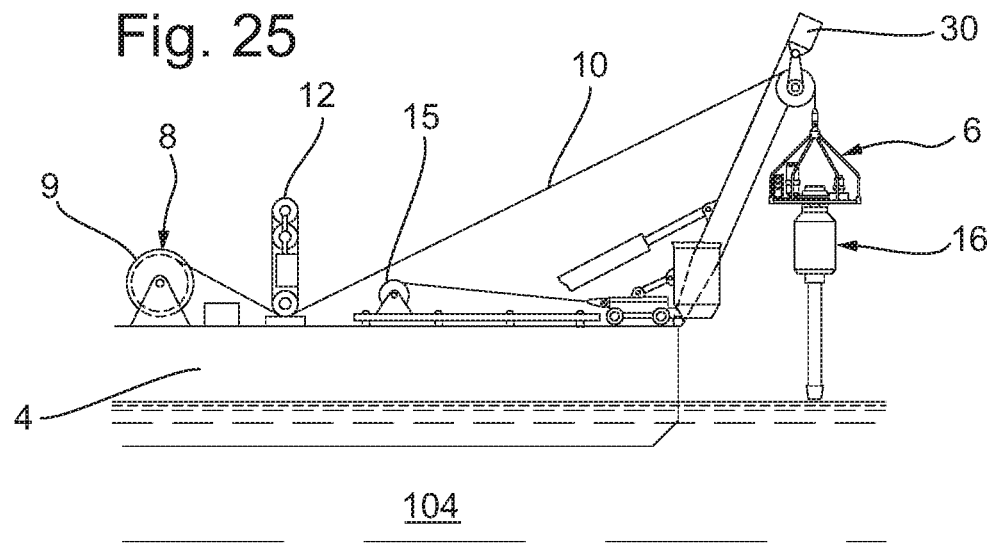
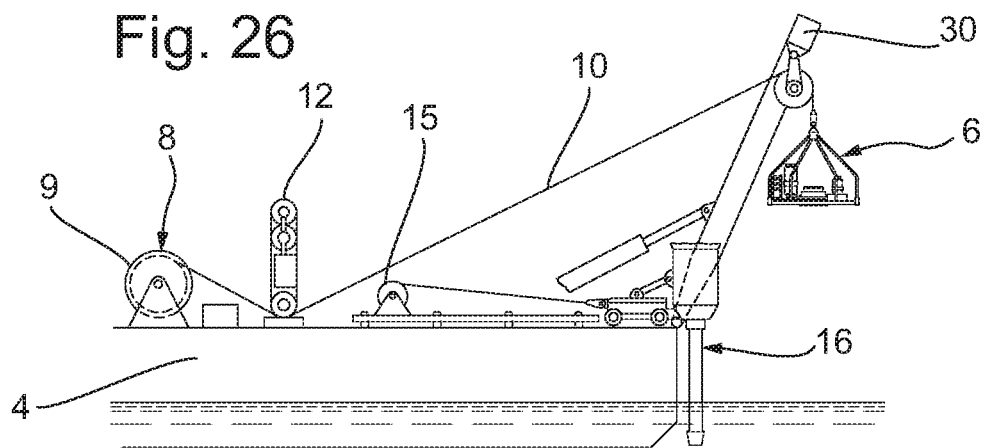

DEVICE, SYSTEM AND METHOD FOR COLLECTING SAMPLES FROM A BED OF A WATERBODY

CROSS-REFERENCE TO RELATED APPLICATIONS

This application is a national stage application of International Application No. PCT/NL2019/050219, which was filed on Apr. 12, 2019, which claims priority to Netherlands Application Number 2020764 filed on Apr. 13, 2018, of which is incorporated by reference in its entirety.

The invention relates to a pin point corer for collecting samples from a bed of a waterbody.

Inter alia, such pin point corers can be used by researchers to sample and study sediment layers at the bottom and the bed of a waterbody, e. g. rivers, lakes or oceans. Recovering sediment cores allows e.g. detecting the present or absence of specific fossils in the mud that may indicate climate patterns at time in the past, such as during the ice ages. Of course, there are multiple other technical fields where the information gathered from the collected samples is useful. Besides collecting samples, pin point corers might also be arranged and allow to collect data from the seabed, e. g. by chemical, optical or physical layer analysis.

There are multiple piston corer constructions known from the art. The goal of many of these corers is to extract samples of the seabed layers. The length and diameter of the seabed samples extracted depends on the type of the corer used. Traditional corers are quite simple in design and are primarily known as gravity corers comprising a tube surmounted by a weight. In general, such corers are used in areas with soft sediment, such as clay. A gravity corer, as mentioned, may be arranged as a pipe that is allowed to free fall into the water. Piston corers have a piston mechanism that is triggered when the corer hits the bottom. Other corers are known, for example vibro corers or box corers which are able to take the sedimentary layers down to about 50 cm CA 2 689 489 A1 discloses a system taught for collection of ocean and seabed data from a moving vessel. The system includes a modular free fall probe for collecting data and a winch system including a drum. A line puller maintains tension on the drum when the probe impacts the seabed and a controller controls rotation of the drum for retrieval of the probe. A method is also taught for collecting ocean and seabed data from a moving vessel by first deploying a probe along a line from a moving vessel and then allowing the probe to free fall through a water body until it impacts a seabed. A line puller is engaged to maintain tension on the drum during free fall and at impact. The line feed is terminated and the line puller is disengaged after impact of the probe with the seabed and the probe is extracted from the seabed by action of the moving vessel. The line is then winched back to retrieve the probe, which is then maintained in a towed position for further deployment.

The major problem all of these corers are having in common is the reliable positioning of the corer, e. g. the vertical positioning and/or the horizontal positioning, especially to ensure that samples are collected at the required and intended position at the seabed. "Samples" in the sense of the invention are samples like sediment layer cores, but optionally also can be other chemical or physical data.

With regard to the horizontal positioning the Kullenberg corer comprises a gravity activator triggering the corer drop. The gravity activator is suspended on a second cable to the side of the Kullenberg corer and activates the corer drop of the Kullenberg corer when it hits the seabed. Due to the complex arrangement of the Kullenberg corer, especially because of its heavy weight and bulk of the system, hazardous conditions may arise in any deployment circumstances, but particularly if waives cause the vessel the Kullenberg corer is attached to roll and pitch.

With most of the corers known from the art, positioning and controlling of the correct position for sample collection is complex and sometimes not reliable possible.

It is therefore an object of the present invention to provide an apparatus and respective methods for an improved, reliable and simple collecting of samples from a seabed of the sea.

This object is solved by a pin point corer for collecting samples from a seabed of a sea, having a control unit to be positioned on a vessel or similar remote position; a top lift unit, which can be attached to a lifting and lowering unit of a vessel via a cable, such that it can be lifted and lowered relative to the seabed; a corer unit, releasable attached to the top lift unit by a fixation unit and arranged for being at least partly driven into layers of the seabed to collect the samples from there, e.g. when released from the top lift unit; wherein the top lift unit comprises a positioning unit bi-directionally communicating with the control unit for controlling the position of the corer unit. The cable can be an umbilical wire.

Also this object is solved by a system for collecting samples from a seabed of a sea comprising a pin point corer as described herein and a vessel, comprising a lifting and lowering unit having a cable, the pin point corer can be attached to.

Also this object is solved by a method for collecting samples from a seabed by use of a pin point corer as described herein, comprising the following steps: lowering lowering water parts, i.e. the top lift unit and the corer unit of the pin point corer in the sea by use of the lifting and lowering unit, the top lift unit is connected to via the cable, wherein the corer unit is attached to the top lift unit; positioning the top lift unit in a defined corer release position in the vicinity of the seabed by use of the positioning unit bi-directionally communicating with the control unit; releasing the corer unit from the top lift unit by activating the release mechanism so that it is at least partly driven into layers of the seabed; collecting samples from layers of the seabed; pulling the corer unit out of the seabed and lifting it back to the vessel.

It has to be mentioned that within this specification all features described in relation to the pin point corer are also applicable in relation to the system and the method, respectively, and vice versa.

By providing the pin point corer and especially its top lift unit with a positioning unit controllable by a control unit for controlling the position of the corer unit a more precise and reliable collecting of samples from the seabed is guaranteed.

As mentioned, "samples" in the sense of the invention are samples like sediment layer cores, but optionally also can be other chemical or physical data gathered from the seabed or its vicinity. Inter alia, within this specification collecting samples from a seabed not only covers collecting samples in the form of sediment cores and similar cores from the seabed layers, but also data gathered from the layers or its vicinity for example via chemical or physical analysis.

The definition of "controlling the position of the corer" may optionally cover navigating the top lift unit to a defined position and especially to change a position. It may optionally also cover controlling a position via sensor elements and in detail reviewing, monitoring and/or cross checking whether the position corresponds to the desired position and especially a coring position. However, controlling the position may only cover to detect a current position for example relative to the seabed or relative to a vessel.

The control unit may be positioned on a vessel or a similar remote position. This remote position can for example be another vessel, a drilling platform, a submarine, satellite or any other remote position. A vessel can be any kind of support platform and especially a swimming support platform. The vessel, however, can also be a platform grounded or partly on the seabed.

The lifting and lowering unit is preferably provided at the vessel and can for example be a main winch or any similar arrangement. The lifting and lowering unit preferably comprises a cable which can be feed in and feed out for lowering and raising the top unit attached to it. Here any kind of lifting and lowering unit, as known from the art, may be applicable. As mentioned, the cable can be an umbilical wire.

It is a gist of the invention that the positioning unit is arranged for bi-directional communicating with the control unit for controlling the position of the corer unit. Optionally the positioning unit is also arranged for controlling the top lift unit and especially the position of the top lift unit when the corer unit is attached to the top lift unit. By positioning the corer unit via the positioning unit and its bi-directional communication with the control unit at the vessel or a similar remote position a reliable and exact positioning of the corer unit is possible so that the quality of the collected samples can be tremendously improved. Dependent on the embodiment provided, an exact vertical and/or horizontal positioning of the corer and selection of the sample collecting position is possible.

Optionally, the corer unit is a free-fall gravity corer unit arranged for being at least partly driven by its dead load into layers of the seabed and to collect samples from there, when released from the top lift unit. When the corer unit is provided as such a free-fall gravity corer unit, especially exact vertical positioning of the corer unit before releasing the same from the top lift unit is important. Therefore, the pin point corer is preferably arranged that a desired corer release position can be reached, being a position providing a free-fall height of the corer unit down to the seabed when it is released of 3-0.5 m, preferably 2-0.5 m, more preferably 1.5-0.5 m. The positioning of the corer unit and the top lift unit, respectively, to reach the corer release position is possible by the bi-directional communication between the positioning unit at the top lift unit, and the control unit at the vessel or remote position.

The corer unit can also be arranged as a corer unit comprising a piston corer or any other enhancement unit for improving driving of the corer into the layers of the seabed, e.g. vibration units, drilling units, etc.

Optionally, the positioning unit comprises at least one sensor of the group comprising a depth sensor, a motion sensor, an acceleration sensor, a positioning sensor, a camera for environment monitoring, the position unit being arranged for sending sensor data received from the sensor to the control unit. Of course, other sensors for detecting and/or controlling the position of the top lift unit are applicable and are therefore also covered by the definition of "sensor" within this specification. In such embodiments, the corer cable can be an umbilical wire, and e.g. allowing for energy supply and/or communication.

The used sensors can provide multiple information and can be used for several objects. The sensor may for example allow detecting of the position of the top lift unit and/or the corer unit. Further, the sensor may allow for detecting reaching a respective position so that e.g. counter control may be initiated. The sensor may be used for controlling the position of the corer unit, for example when it is still attached to the top lift unit and/or when it is released and especially for controlling and checking whether the corer unit entered the layers of the seabed in a correct way and/or at the correct collecting position.

The sensors are preferably communicating with the control unit in a bi-directional communication via the positioning unit. Said bi-directional communication may be acoustic or optical communication. In such embodiments, the units further comprise electric power sources, such as batteries. Especially in this regard the top lift unit may comprise a sub-control unit part of the positioning unit optionally arranged for communicating with the sensors. The sub-control unit may be arranged for controlling, communicating and monitoring data of the top lift unit and/or the corer unit.

With the at least one sensor being a camera it is for example possible to detect the current and/or a desired location of the corer unit of the pin point corer and especially the correct corer positioning before releasing the corer unit. It is also possible to check whether the corer unit has entered the seabed in a correct way and/or in a correct position. Also the cameras may be arranged to check whether the corer unit has been released from the top lift unit and/or to check whether a re-attaching of a released corer unit to the top lift unit is operated in a corrected manner and/or has been successful.

With the sensors bi-directionally communicating with the control unit controlling the desired depth positioning of the top lift unit and/or its relative position to the vessel and/or the seabed might be possible. Further, by respective sensors, e.g. by depth and acceleration sensors, the upward motion of the top lift unit due to the loss of weight of the corer unit and the spring action of the cable can be detected and optionally further controlled. Preferably, a depth stabilizer unit is provided additionally, especially to the lifting and lowering unit for especially automatically, controlling the vertical position of the top lift unit especially when the corer unit has been released.

This depth stabilizer unit is optionally provided on deck of the vessel and is arranged for compensating sudden vertical forces acting on the top lift unit to level the top lift unit relative to the seabed. Without use of a depth stabilizer the surplus corer wire length may be arranged such that it compensates the spring action of the cable to keep the piston to stay at modulate level when the corer unit has been released.

Optionally, the positioning unit comprises at least one thruster or similar acceleration means for at least horizontally positioning the top lift unit and optionally for at least horizontally positioning of the top lift unit when the corer unit is attached to the top lift unit. By this thruster and especially in combination with a sensor, like a camera or any other of the before mentioned sensors, an exact positioning of the corer unit in a desired e.g. coring position is possible. In addition horizontal drift of water parts of the pin point corer, i.e. inter alia the corer unit and the top lift unit, and/or of the vessel can be compensated in a reliable manner. Furthermore, it is possible to detect and navigate to interesting corer positions in situ by use of the bi-directional communication between the positioning unit and the control unit and in detail, by the bi-directional communication between the the control unit, the sensors, and the thruster. The control unit is optionally arranged to also control the lifting and lowering device and/or the depth stabilizer unit. Optionally the positioning unit is also arranged for such control operations. Optionally, an arrangement is provided where the horizontal and the vertical position of the top lift unit can be detected by the sensors and be controlled by the at least one thruster and the lifting and lowering unit and/or the depth stabilizer unit at the vessel, respectively.

Optionally, the fixation unit releasable, securing the corer unit to the top lift unit, is controllable by the control unit. Optionally the corer unit can be released from the top lift unit by a release signal originating from the control unit directed to the fixation unit. By such an arrangement, the corer unit can be released in a control manner after a correct corer position has been found and especially has been found by use of the positioning unit and its respective sensors and/or thruster. Optionally, the fixation unit comprises an hydrostatic actuator for opening the fixation unit to release the corer unit attached to the top lift unit. This hydrostatic actuator may be a release mechanism powered by the hydrostatic pressure and preferably activated by a solenoid valve. By such an arrangement a minimum equipment of active power elements can be provided, simplifying the construction of the pin point corer and its top lift unit, respectively.

Optionally, it is possible that the release unit is arranged that re-attaching of a corer unit and especially of a before released corer unit is possible. Here respective clamping mechanisms as known from the art can be provided.

By attaching and especially re-attaching a corer unit to the top lift unit it is for example possible to pull the corer unit out of the seabed via the cable attached to the top lift unit after the corer unit has been (re-) attached to the top lift unit.

Optionally, a position indicator is provided for detecting the corer unit position. This position indicator may be a sensor of the positioning unit, as mentioned before. It can be arranged to detect the corer position and especially whether the corer unit is attached to the top lift unit or not. It can, however, also be arranged to detect the corer position after it has been released and especially when it has been driven into the seabed and/or the distance of the corer unit from the top lift unit. Optionally the position indicator is arranged at the fixation unit.

Optionally, the corer unit is connected to the top lift unit via a corer wire. This corer wire can be any kind of wire, rope or similar connection for connecting the top lift unit with the corer unit. Optionally, the corer wire is arranged such that the corer unit can be pulled out of the seabed by pulling at the corer wire.

Optionally, the corer wire is attached to a winch arranged such that the corer wire can be spooled out when the corer unit is released from the top lift unit and/or arranged such that the top lift unit can be pulled to the corer unit, e. g. when the corer unit is driven into the layers of the seabed and/or arranged such that the top lift unit can be pulled to the corer unit to engage and optionally to re-engage with the fixation unit. The winch to which the corer unit is attached to, can optionally be provided at the top lift unit. Optionally, the winch is powered by batteries. Further optionally, the winch is arranged for communicating and especially bi-directionally communicating with the control unit at the vessel.

Dependent on the embodiment provided releasing and dropping of the corer may require a surplus length of the corer wire. When a winch is provided the winch is optionally provided to spool out the required length of the corer wire. Optionally, also level change of the top lift unit due to the loss of weight by releasing of the corer unit may be equalized by additional surplus length of the corer wire.

When no winch is provided, the top lift unit and/or the corer unit and/or the corer wire may be provided with a guiding unit for guiding the corer wire, especially when releasing the corer unit. Optionally, the corer wire comprises multiple corer wire parts connectable with each other. E.g. by such a multi-part corer wire detaching the corer unit from the top lift unit is possible, especially when pulling the corer unit and its respective parts out of the water and onto the vessel.

The process of pulling the corer unit out off of the seabed can be arranged in different ways dependent on the provided embodiment of the pin point corer.

When the corer unit is connected to the top lift unit via a corer wire the step of pulling the corer unit out of the seabed may comprise the step of pulling the cable thereby pulling at the corer wire and pulling the corer unit out of the seabed. By this kind of method the top lift unit can be pulled in direction to the vessel together with the corer unit. In a special embodiment, the corer wire comprises an additional connection head such that an intermediate lifting device can be attached to the corer wire for lifting the corer unit to the vessel individually of the top lift unit. This is applicable when the corer unit has been pulled to the vicinity of the vessel.

As explained, the pin point corer may be arranged such that the corer wire is attached to a winch arranged such that the top lift unit can be pulled to the corer unit, e. g. when the corer unit is driven into the layers of the seabed and/or arranged such that the top lift unit can be pulled to the corer unit to engage and especially re-engage with the fixation unit. By such an arrangement it is possible to pull the top lift unit to the corer unit, optionally by releasing the lifting and lowering device and/or the depth stabilizer and to engage the corer unit with the top lift unit.

Especially in this regard the step of pulling the corer unit out of the seabed optionally comprises the steps of pulling the top lift unit to the corer unit and optionally thereby feeding out the cable, e.g. by respectively activating the lifting and lowering device and/or the depth stabilizer; (re-)attaching the corer unit to the top lift unit; and pulling the cable in such a way that the top lift unit is lifted thereby pulling the corer unit out of the seabed. Optionally the pin point corer is arranged that the top lift unit with the attached corer unit can be lifted up to the vessel by pulling the cable.

Figure 2:
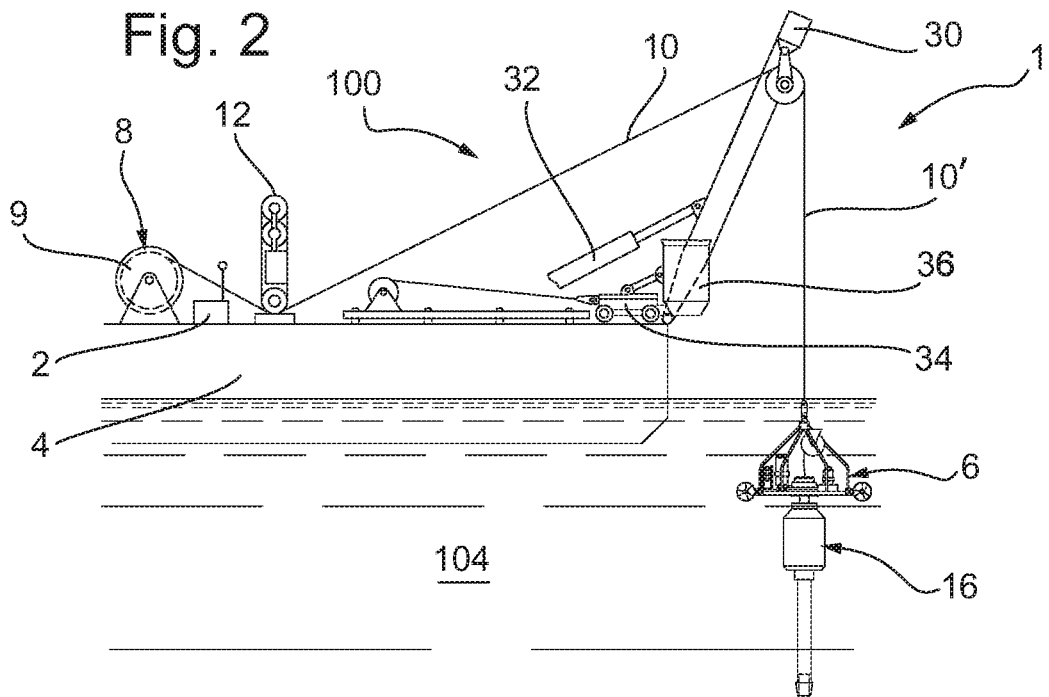
Figure 3:
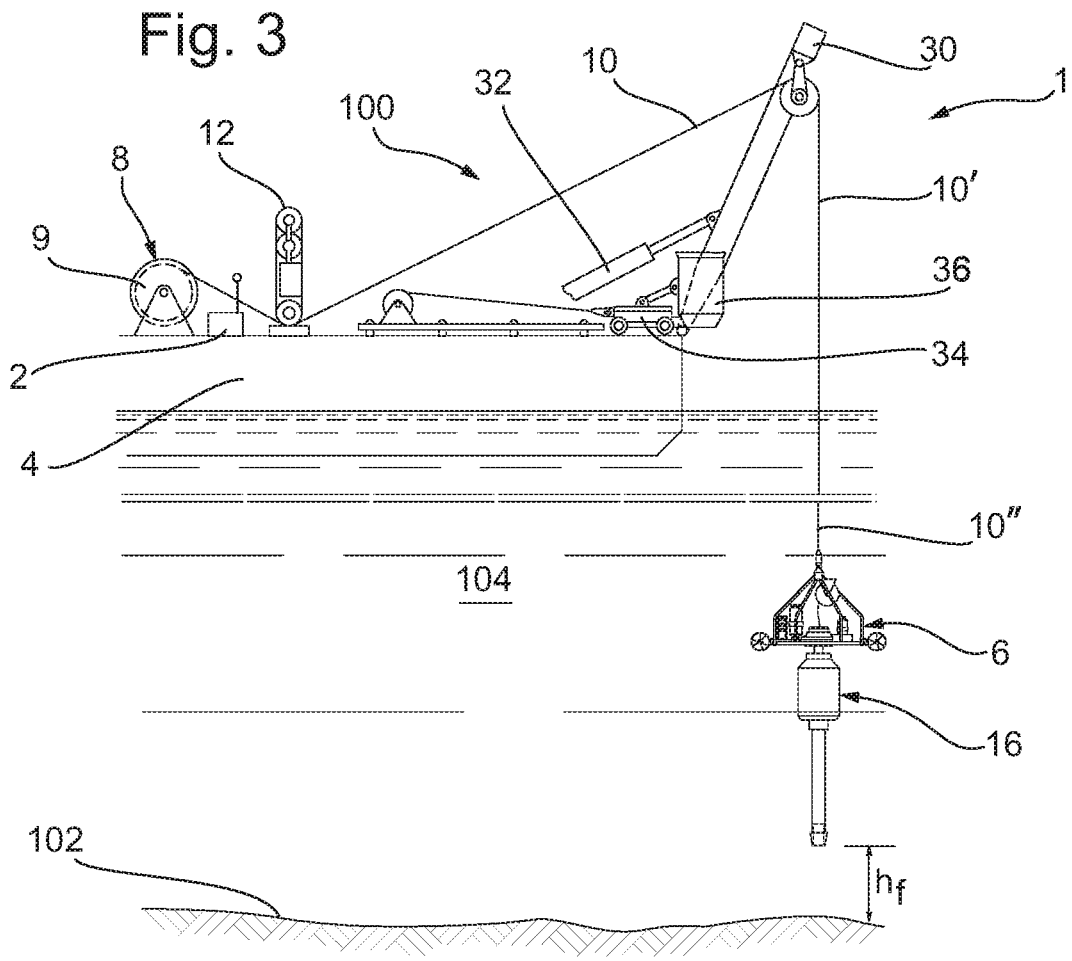
Figure 4:
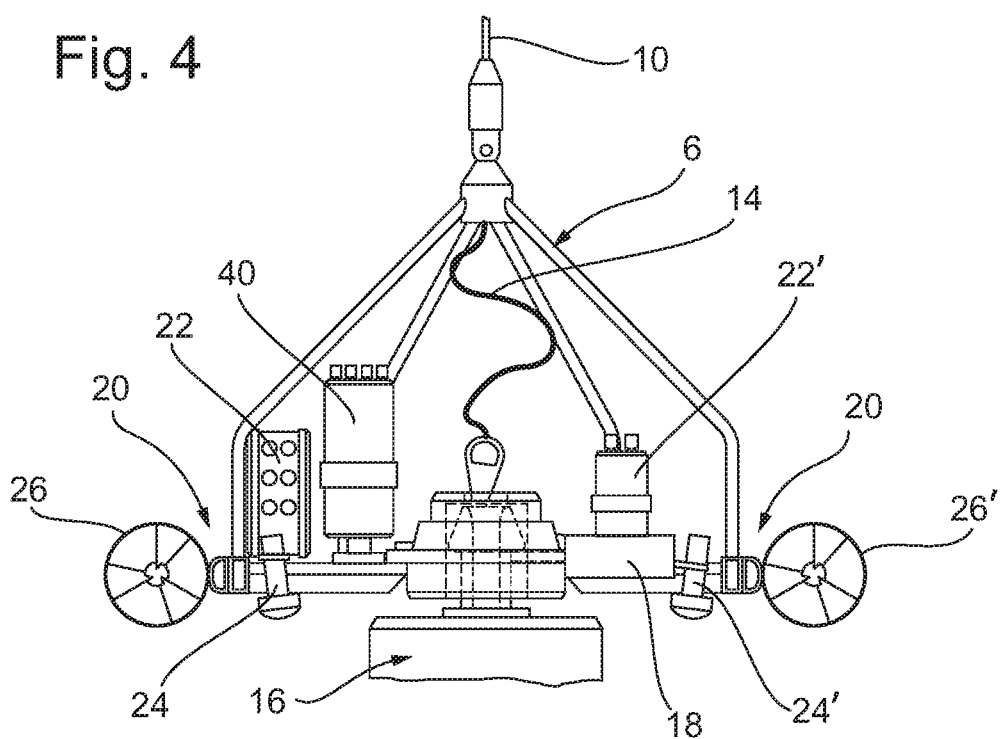
Figure 13:
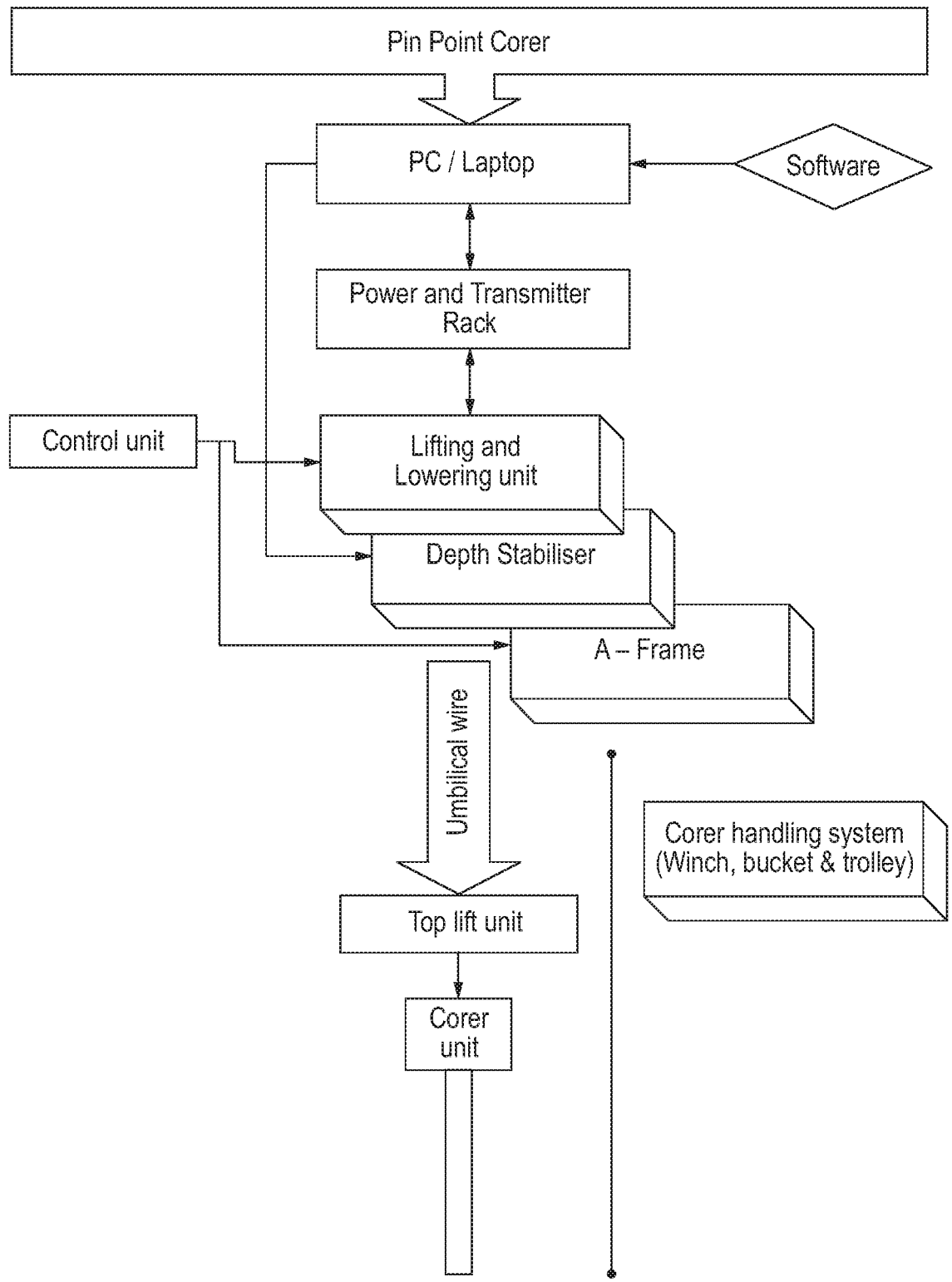
Figure 14:
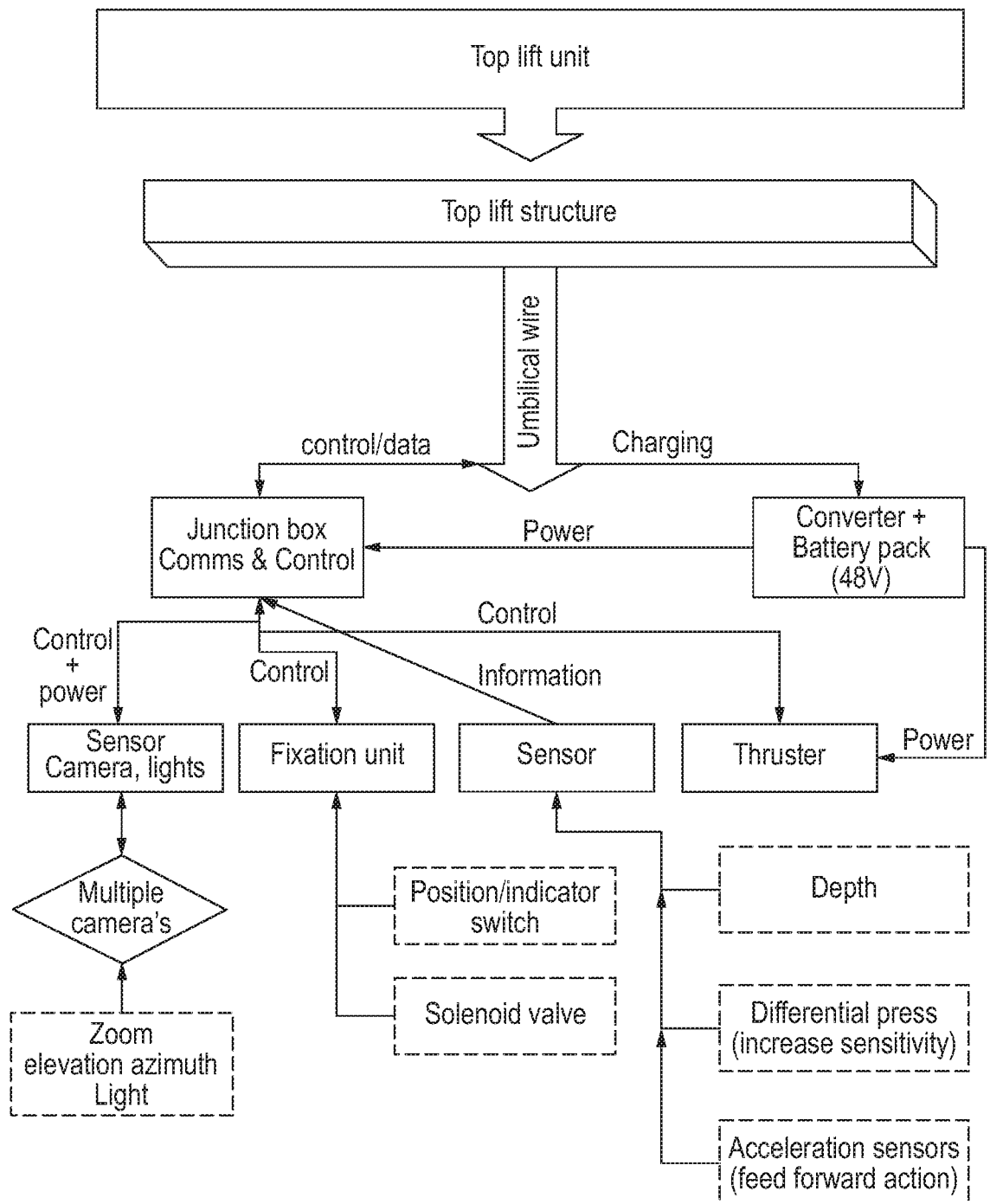
Figure 15:
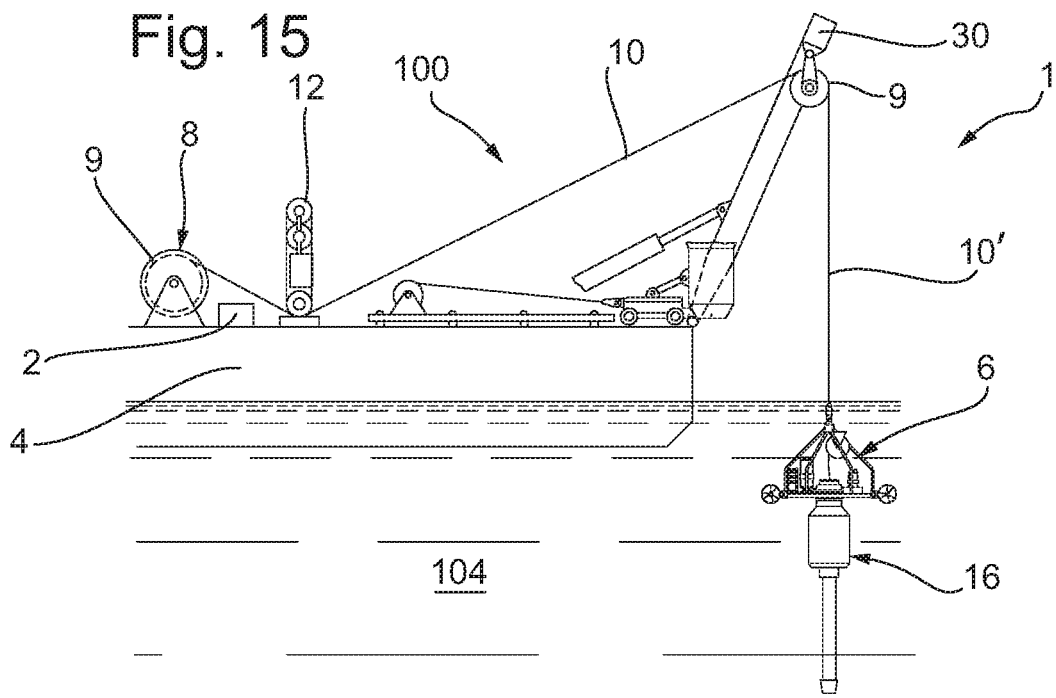
Figure 17:
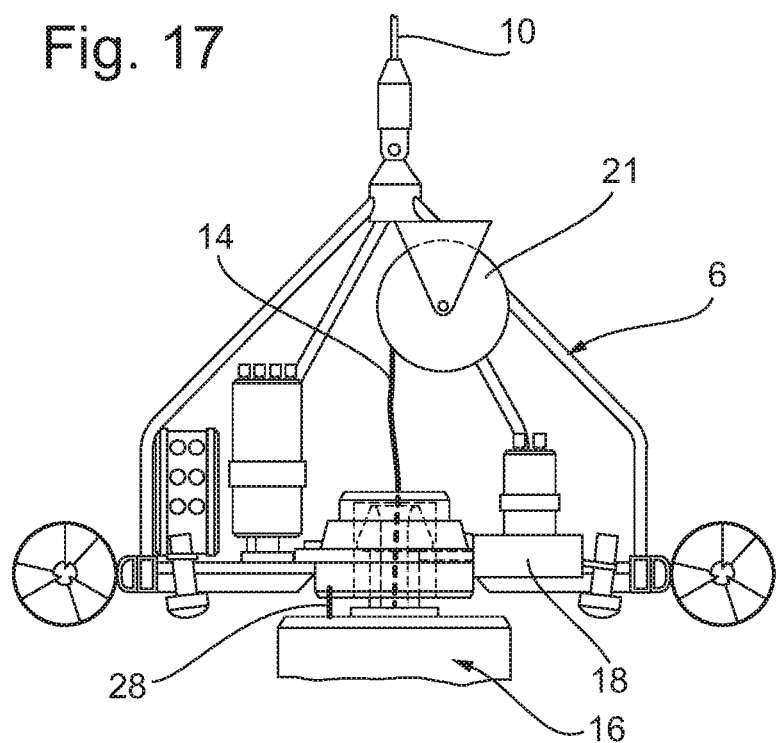
Figure 19:
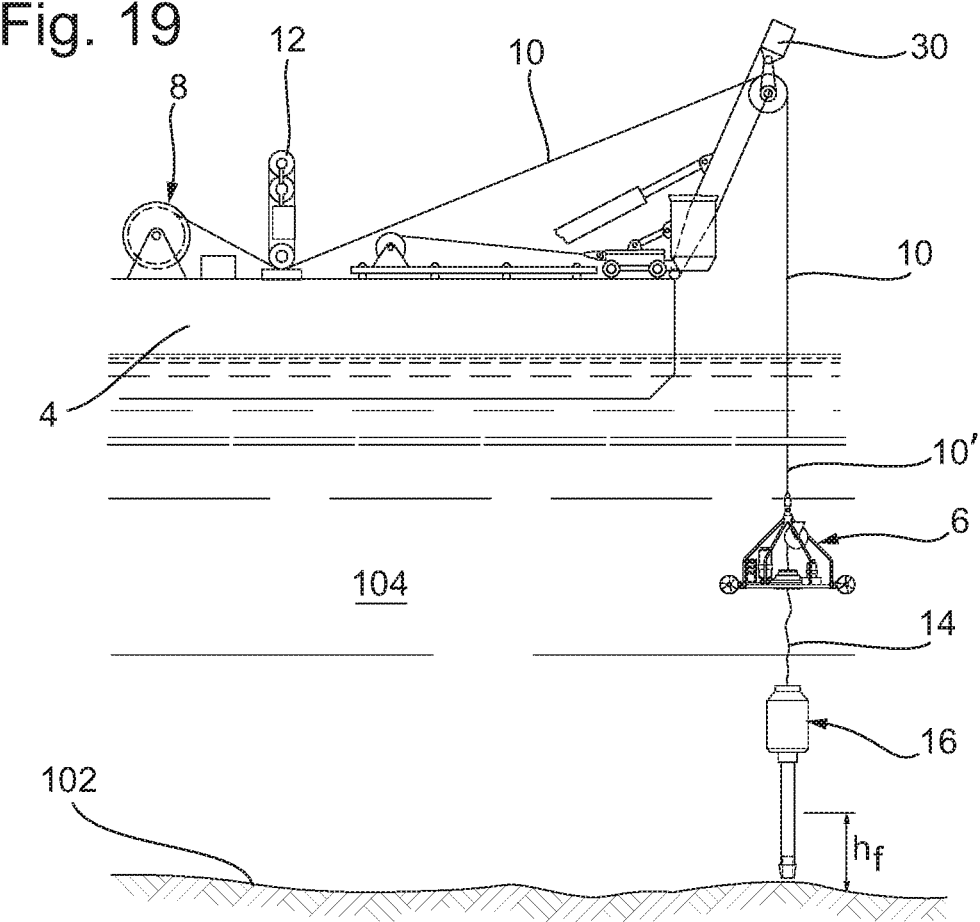
Figure 20:
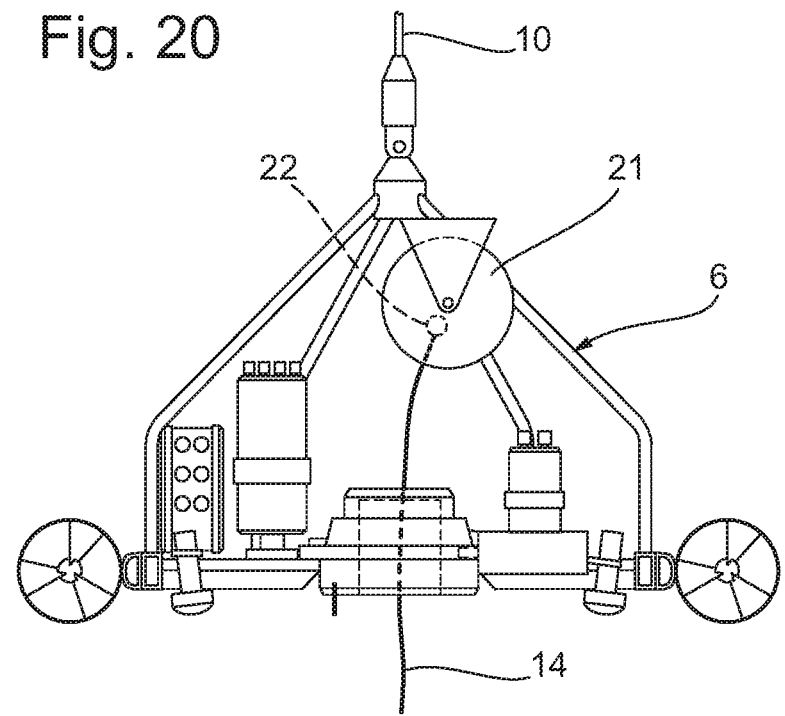
Figure 21:
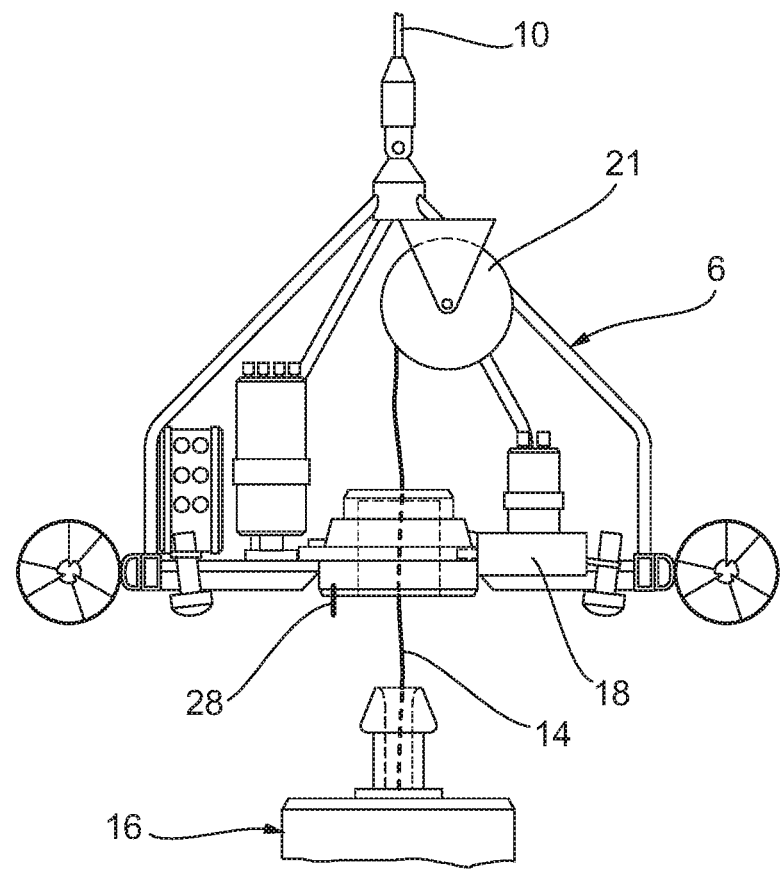
Figure 27:
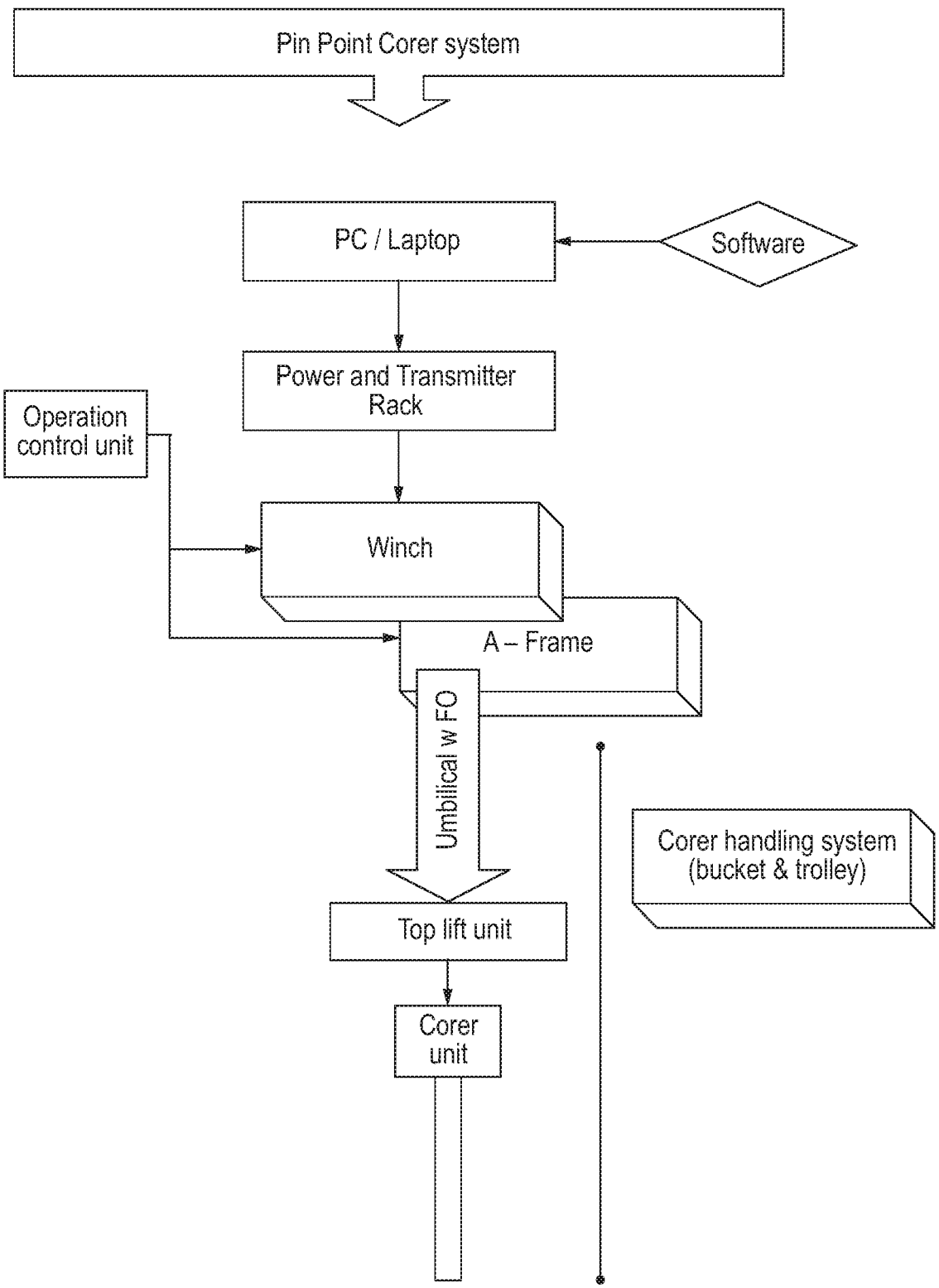
Figure 28:
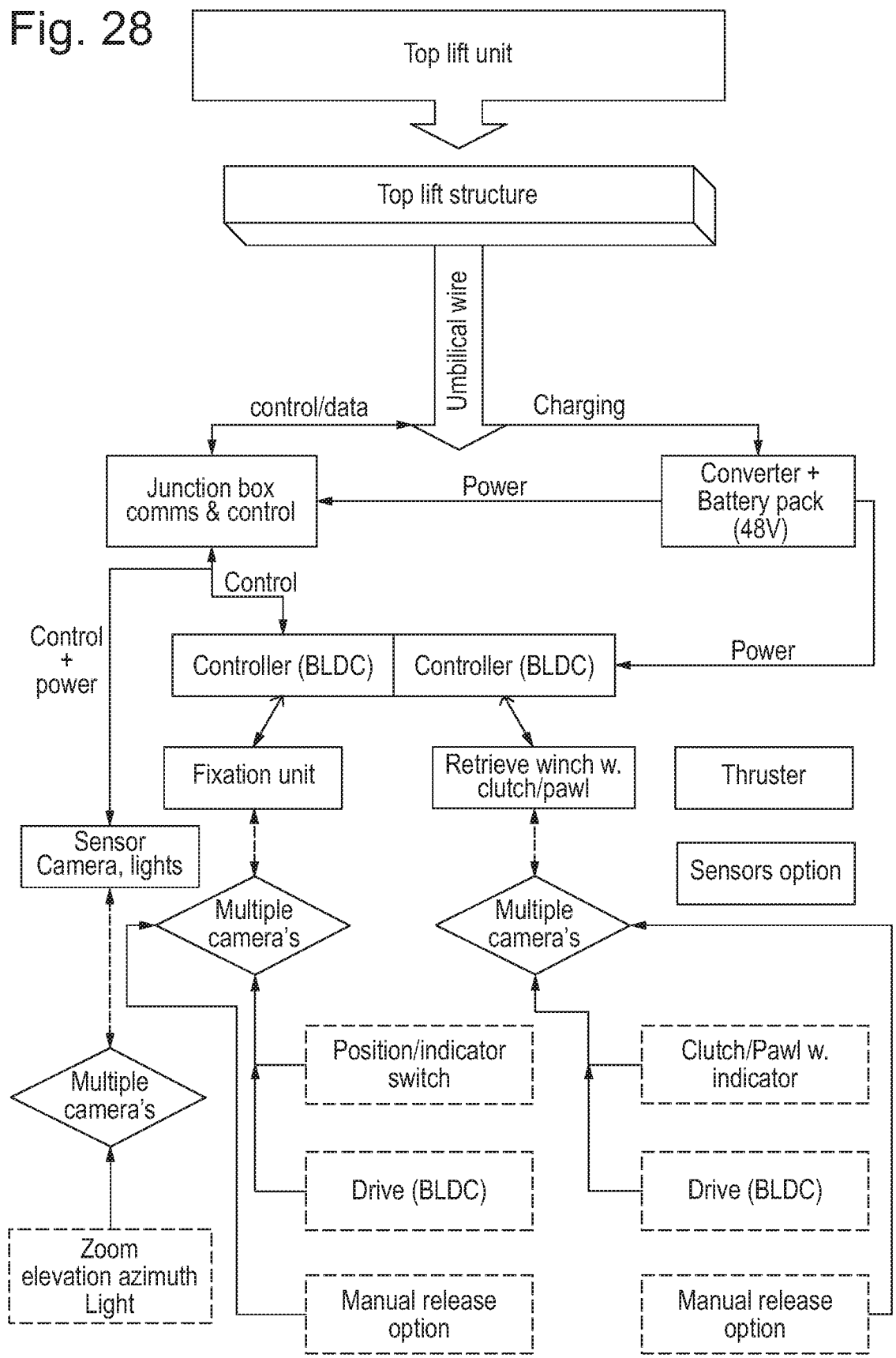

These and other features, aspects, and advantages of the apparatus, system and method of the present disclosure, would become better understood from the following description, appended claims, and accompanying drawings, wherein the Figures show:

FIG. 1 to 3 one embodiment of a system for collecting samples from a seabed according to the invention while deploying an embodiment of a pin point corer;

FIG. 4, 5 a detailed view of the pin point corer according to FIG. 1 in an attached and a released state;

FIG. 6 to 8 the system of FIG. 1 while dropping the corer unit, collecting a sample and pulling the pin point corer out of the seabed;

FIG. 9-12 the system of FIG. 1 while recovering the pin point corer;

FIG. 13 a schematic representation of another embodiment of the pin point corer;

FIG. 14 a schematic representation of one embodiment of the top lift unit according to the invention;

FIG. 15, 16 another embodiment of the system for collecting samples from a seabed while deploying another embodiment of the pin point corer;

FIG. 17, 18 a detailed view of the embodiment of the pin point corer according to FIG. 15 in an attached and a released state;

FIG. 19 the system according to FIG. 15 while dropping the corer unit;

FIG. 20 a detailed view of the top lift unit of the embodiment according to FIG. 15 while dropping the corer unit;

FIG. 21 a detailed view of the pin point corer while pulling the top lift unit to the corer unit;

FIG. 22-24 a detailed view of the pin point corer while pulling the top lift unit over the corer unit and the pin point corer out of the seabed;

FIG. 25, 26 the system of FIG. 15 while recovering of the pin point corer;

FIG. 27 a schematic representation of another embodiment of the pin point corer; and FIG. 28 a schematic representation of another embodiment of the top lift unit.

Unless otherwise defined, all terms (including technical and scientific terms) used herein have the same meaning as commonly understood by one of ordinary skill in the art to which this invention belongs as read in the context of the description and drawings. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some instances, detailed descriptions of well-known devices and methods may be omitted so as not to obscure the description of the present systems and methods. Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise it will be understood that when a connection between structures or components is described, this connection may be established directly or through intermediate structures or components unless specified otherwise. All publications, patent applications, patents, and other references mentioned herein are incorporated by reference in their entirety. In case of conflict, the present specification, including definitions, will control.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. The description of the exemplary embodiments is intended to be read in connection with the accompanying drawings, which are to be considered part of the entire written description. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. Relative terms as well as derivatives thereof should be construed to refer to the orientation as then described or as shown in the drawing under discussion. These relative terms are for convenience of description and do not require that the system be constructed or operated in a particular orientation unless stated otherwise.

FIGS. 1 to 3 show a side view of one embodiment of a system 100 for collecting samples from a seabed of a sea according to the invention. The system comprises a pin point corer 1 and a vessel 4. The vessel comprises a lifting and lowering unit 8 having an cable 10 where water parts, i.e. inter alia a corer unit 16 and a top lift unit 3 of the pin point corer 1 can be attached to. The cable 10 can be an umbilical wire, and especially allowing for energy supply and/or communication. By use of the lifting and lowering device the water parts of the pin point corer can be lowered and lifted within the sea 104 and in detail to the vicinity of the seabed 102, and especially to a corer release and sample collection position, where samples have to be collected. This can be controlled by the control unit 2 positioned on the vessel or a similar remote position.

The lifting and lowering unit 8 optionally comprises a main winch 9, the cable 10 can be feed by. Further, the lifting and lowering unit 8 optionally comprises an A-frame arrangement 30 and hydraulic activators 32 for lifting and moving the pin point corer 1 attached to the cable. Further provided is a depth stabilizer 12 for stabilizing the depth of the pin point corer during the sample collection process, as will be explained in the following in more detail. For deploying and recovering the pin point corer 1 further a trolley 34 comprising a bucket 36 may be provided as also be explained in the following.

At the beginning of the deployment process, the water parts to be lowered to the seabed of the pin point corer, i.e. inter alia the top lift unit 6 and the corer unit 16, are attached to the lifting an lowering unit 8 in such a way that they can be lifted and moved from the vessel 4 to the open sea and in the water. Here, a trolley 34 and a bucket 36 are provided, wherein the bucket is arranged such that the water parts 6, 16 of the pin point corer 1 can be secured to and lifted by pulling at the cable 10 via the main winch 9. After the water parts 6, 16 of the pin point corer 1 have been lifted out of the bucket 36, the A-frame swivels the water part 6, 16 of the pin point corer 1 outwards in direction to the sea 104 wherein the main winch 9 lowers the pin point corer downwards to the seabed.

As shown in FIG. 3, when a desired corer release position, e.g. providing a desired free fall height $h_f$ is reached, the lowering process stops by stopping the lifting and lowering device 8, e.g. the main winch 9.

In this corer release position the pin point corer 1 is ready for beginning the collecting process.

In a possible embodiment, as for example shown with FIGS. 1 to 3, the pin point corer comprises the top lift unit 6 which can be attached to the lifting and lowering unit 8 of the vessel 4 via the cable 10 such that it can be lifted and lowered relative to the seabed 102.

The pin point corer 1 further comprises the corer unit 16 releasable attached to the top lift unit 6 by a fixation unit 18 (see FIGS. 4 and 5) and arranged for being at least partly driven into layers of the seabed 102 to collect the samples from there (see FIGS. 6 and 7), e. g. when released from the top lift unit 6. By releasing the fixation unit 18, the corer unit 16 can be released from the top lift unit 6 to be driven into the seabed 102.

As e.g. shown with FIGS. 6-8, optionally, the corer unit 16 is provided as a free fall gravity corer unit 16, arranged for being at least partly driven by its death load into layers of the seabed 102 and to collect samples from there, when released from the top lift unit 6. Optionally and especially with this regard the corer unit 16 therefore comprises a corer nozzle 17 and a corer weight 19. In a special embodiment, the corer unit 16 is provided as a piston corer unit comprising a piston 13 as known from the art.

Dependent on the embodiment of the pin point corer 1 and especially of the corer unit 16, the corer release position is a position providing a free fall height $h_f$ down to the seabed 102 of the corer unit 16 when it is released of 3-0.5 m, preferably 2-0.5 m, more preferably 1.5-0.5 m. This free fall height is depicted by reference $h_f$ in FIG. 3.

Figure 5:
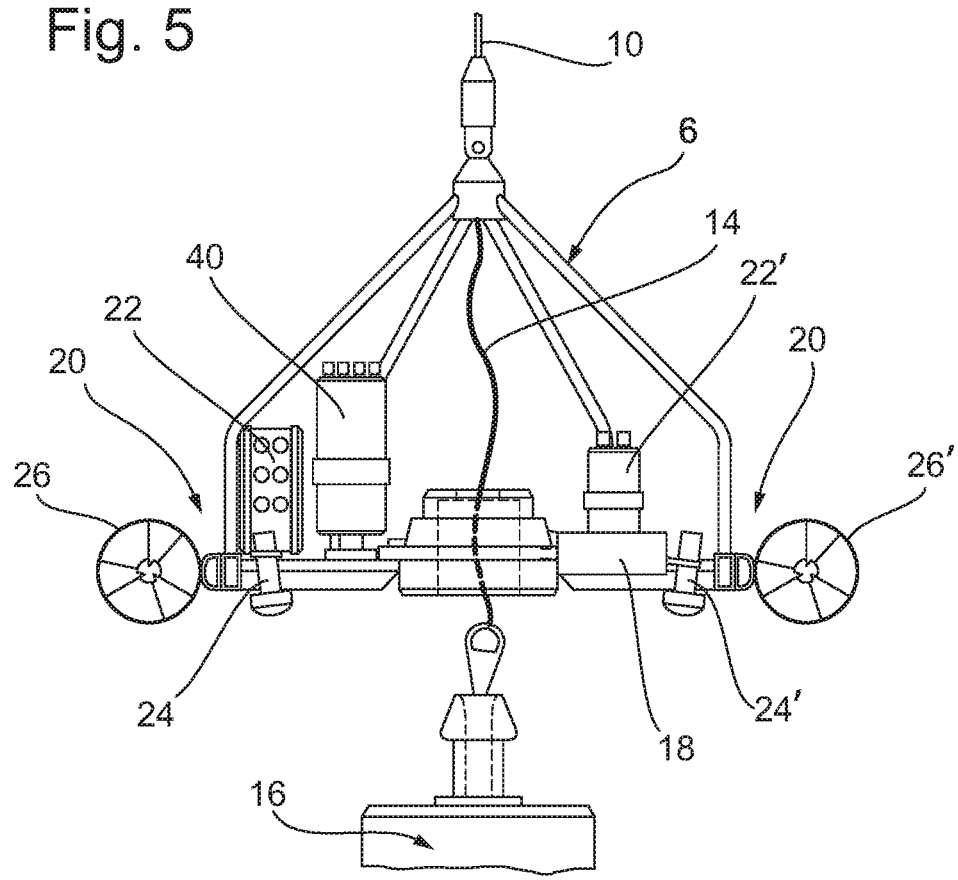

FIG. 4 to 5 show detailed views of an embodiment of the pin point corer 1 and especially of the water parts 6, 16 of the pin point corer 1 shown with FIGS. 1 to 3.

The pin point corer 1 comprises the top lift unit 6 and the corer unit 16 releasable attached to the top lift unit 6 via the fixation unit 18. The fixation unit 18 can be controlled from a remote position and especially from a control unit arranged at the vessel 4 (see FIG. 1). The fixation unit may comprise a hydrostatic actuator for releasing the corer unit 16 attached to the top lift unit and especially under the control of the control unit 2. This hydrostatic actuator might comprise a solenoid valve.

In a special embodiment, the fixation unit 18 be provided that not only engaging with and releasing of the corer unit 16 is possible, but also (re-)engaging of a corer unit which has been released from the top lift unit before, i. e. for collecting a sample.

As can be seen with FIGS. 4 and 5, the top lift unit comprises a positioning unit 20 which is arranged for bi-directionally communication with the control unit 2 for controlling the position of the corer unit.

For such positioning the positioning unit 20 optionally comprises at least one sensor of the group of the multiple available sensors 22, 24. Such a sensor 22 can for example be a depth sensor, a motion sensor, an acceleration sensor or a positioning sensor. All these sensors are optionally provided at the top lift unit as shown with FIGS. 4 and 5. A further sensor can be provided, i. e. a camera 24, e. g. for environment monitoring. The sensor 22, 24 can also be provided as a CTD device for gathering conductivity, temperature and depths of the top lift unit. In principle, the position unit 20 is optionally arranged for sending sensor data received from the sensor 22,24 to the control unit and further optionally for receiving data from the control unit 2. Such communication can be arranged via the cable 10 and a respective wired signal connection or any other possible data communication between the vessel 4 and its control unit 2 and the water parts of the pin point corer especially when it is under water.

Here of course any other kind of communication, e.g. wireless communication via a radio communication, optical communication, acoustic communication etc. is applicable.

With this embodiment, the top lift unit optionally comprises two high definition cameras 24 for environment monitoring and especially for monitoring the position of the top lift unit under water. Further, respective lights may be provided (not shown, but here optionally provided). The cameras may further serve for control of the corer unit 16 and especially whether dropping and driving the corer unit into the seabed 102 was successful. Optionally the sensors 22, 24, and especially the cameras 24 can be used for detecting and searching desired sample collecting positions for collecting samples. As explained before, data gathered from the sensors is provided via data communication to the control unit 2 at the vessel 4.

As can be further seen with FIGS. 4 and 5, the top lift unit 16 comprises at least one thruster 26 for at least horizontal control, and especially navigation of the top lift 6 unit. By activating the thrusters 26 horizontal navigation of the top lift unit is possible, wherein the position of the top lift unit 6 can be controlled by the sensor 22,24 and here especially by the camera 24. Of course, other sensors can be used for position detection and control.

For activating the thrusters 26 a power supply and especially battery packs 40 may be provided. Of course, also a wired power supply from the vessel 4 etc. can be provided.

As can be again seen with FIGS. 4 and 5, the top lift unit comprises an open and lightweight construction and especially a frame structure, and optionally of a lattice structure, acting as a carrier element for the respective equipment of the top lift unit, e.g. the sensors, thrusters, batteries etc.

Further, a corer wire 14 may be provided connecting the top lift unit 6 with the corer unit 16.

As explained the pin point corer 1 is arranged for detecting a collecting position via its sensors 22, 24 and especially via the cameras 24. Further, sensors may be provided for depths and acceleration detection and control. Navigation of the water parts of the pin point corer is possible via the lifting and lowering device of the vessel and via the thrusters to find the desired collection position. After this position is found, releasing of the corer unit 16 is possible controlled by the control unit 2 arranged at the vessel as explained in the following.

After positioning the top lift unit 6 such that the corer unit 16 is arranged in a desired position, e.g. with a free fall height $h_f$ from the seabed as mentioned before, the fixation unit 16 (see FIGS. 4 and 5) can be released and opened, respectively, to release the corer unit 16. As can be seen with FIGS. 6 and 7, the corer unit 16 can be arranged such that it drops from the top lift unit 6 thereby being driven into the seabed 102, especially with its corer nozzle 17. With this embodiment the corer unit 16 optionally is a piston corer comprising the piston 13. Any other known corer unit form the art may also be provided. As can be seen with FIG. 7 the piston 13 stays at seabed level wherein the corer nozzle 17 drops over the piston 13.

While dropping the corer unit 16 and driving it into the seabed 102, the corer wire 14 is pulled out. It becomes clear that the length of the corer wire 14 preferably should to be slightly longer than the closest distance of the top unit 6 to the corer unit 16 driven in the seabed 102.

To ensure that after releasing the corer unit 16 from the top lift unit 6 the top lift unit 6 is not flipped upwards in an uncontrolled manner due to loss of weight, the depth stabilizer 12 may be provided on the vessel 4. This depth stabilizer 12 is optionally part of the lifting and lowering unit and allows levelling of the top lift unit in a very quick and reliable manner. Control of levelling of the top lift unit 6 can further be enhanced by use of the sensors 22 sending information with regard to the position and acceleration/movement of the top lift unit 6 to the control unit. The control unit then may be arranged to control the lifting and lowering unit and especially the depth stabilizer 12 and/or the main winch 9.

At the target depths, e. g. the corer release position, the depth stabilizer may keep the pin point corer stable in vertical direction. It may be applicable that the main winch 9 is adjusted when the stabilizer comes out of range.

After the sample has been collected from the seabed 102, the corer unit has to be pulled out of the seabed. In one embodiment the pin point corer 1 may be arranged such that the corer unit 16 can be pulled out of the seabed by pulling at the cable 10 in such a way that the top lift unit is lifted thereby pulling at the corer wire 14 and pulling the corer unit 16 out of the seabed 102. This is for example shown with FIG. 8.

Figure 9:
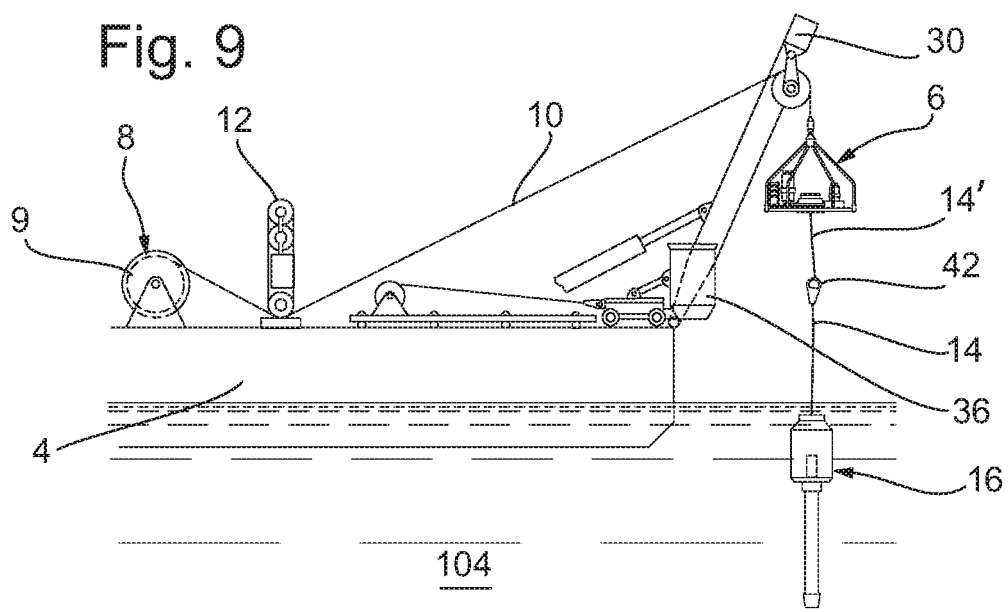
Figure 10:
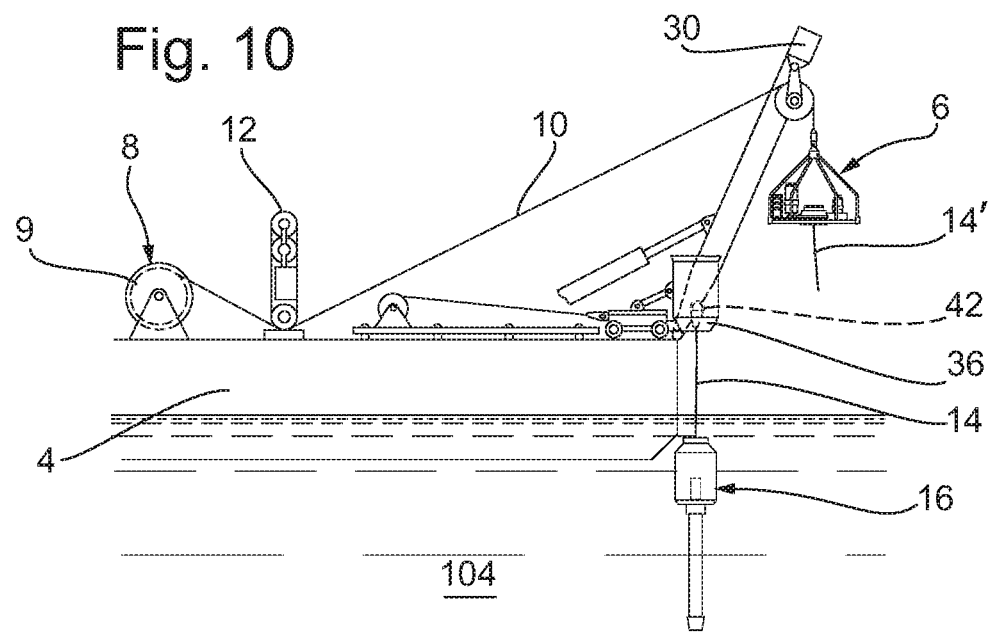
Figure 11:
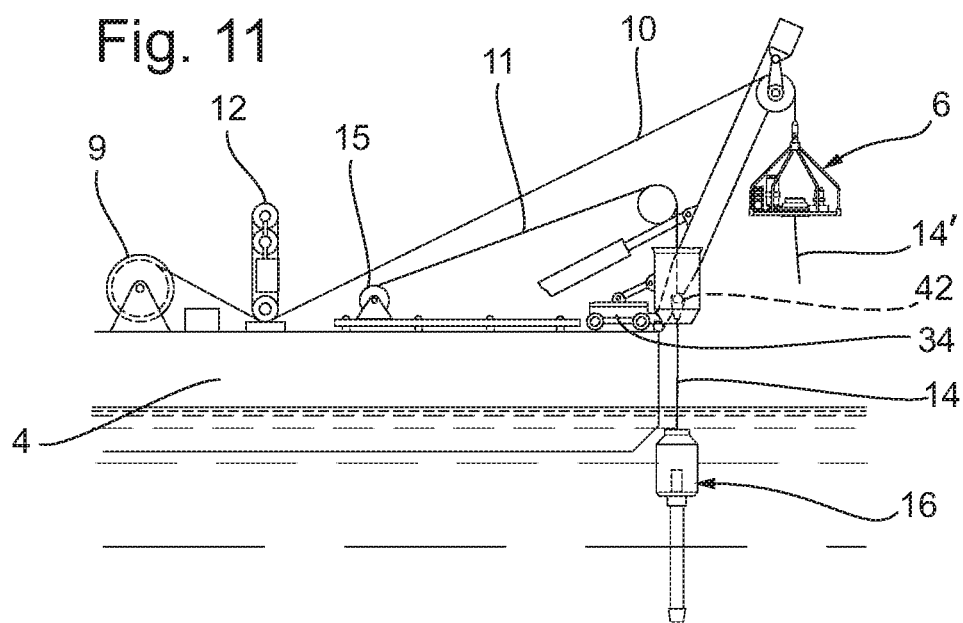
Figure 12:
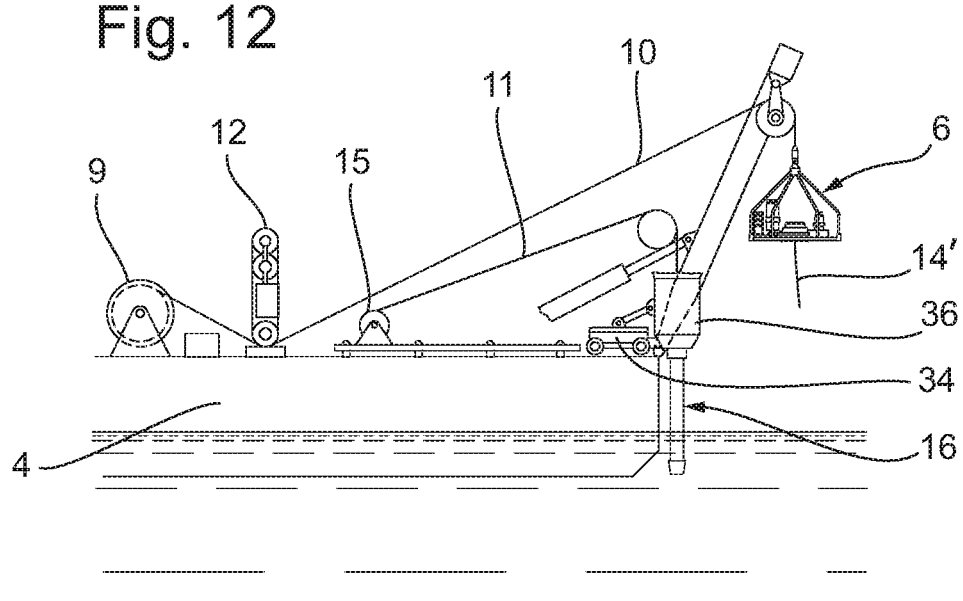

FIGS. 9 and 10 show the embodiment of the system of FIG. 1 while recovering of the pin point corer 1 and its top lift unit 6 and corer unit 16, respectively. As explained before, here the corer unit is attached to the top lift unit 6 by the corer wire 14.

As can be seen with FIGS. 7 to 10, the corer wire 14 comprises a peer socket 42 allowing detaching of the corer unit 16 from the top lift unit 6. For recovering the water parts 6, 16 of the pin point corer by use of this peer socket 42 the before-mentioned bucket or a similar fixation device 36 is arranged such that the peer socket 42 can be temporarily secured thereto. After securing the peer socket 42 to the bucket 36, the top lift unit 6 can be detached and stored to the vessel 4. This is for example possible by use of the A-frame 30 and swivelling each in direction of the vessel.

The corer unit 16 secured to the bucket 36 via the peer socket 42 can be recovered to the vessel for example by use of a lifting and lowering device, i.e. the main winch 9 or another sub-winch 15 and a respective wire 11 or similar rope. With this embodiment the core unit 16 is arranged to be secured to the bucket 36 wherein the bucket can then be swivelled in direction to the vessel to secure the corer unit 16 to the vessel. For moving the corer unit 16 to the vessel a trolley 34 can be provided which is optionally also moveable by a lifting and lowering device and especially by a sub-winch 15.

FIG. 13 represents a schematic visualization of an embodiment of the pin point corer 1 showing respective assemblies and modules provided.

The same applies for FIG. 14 showing an embodiment of the top lift unit and its possible assemblies and modules.

Figure 16:
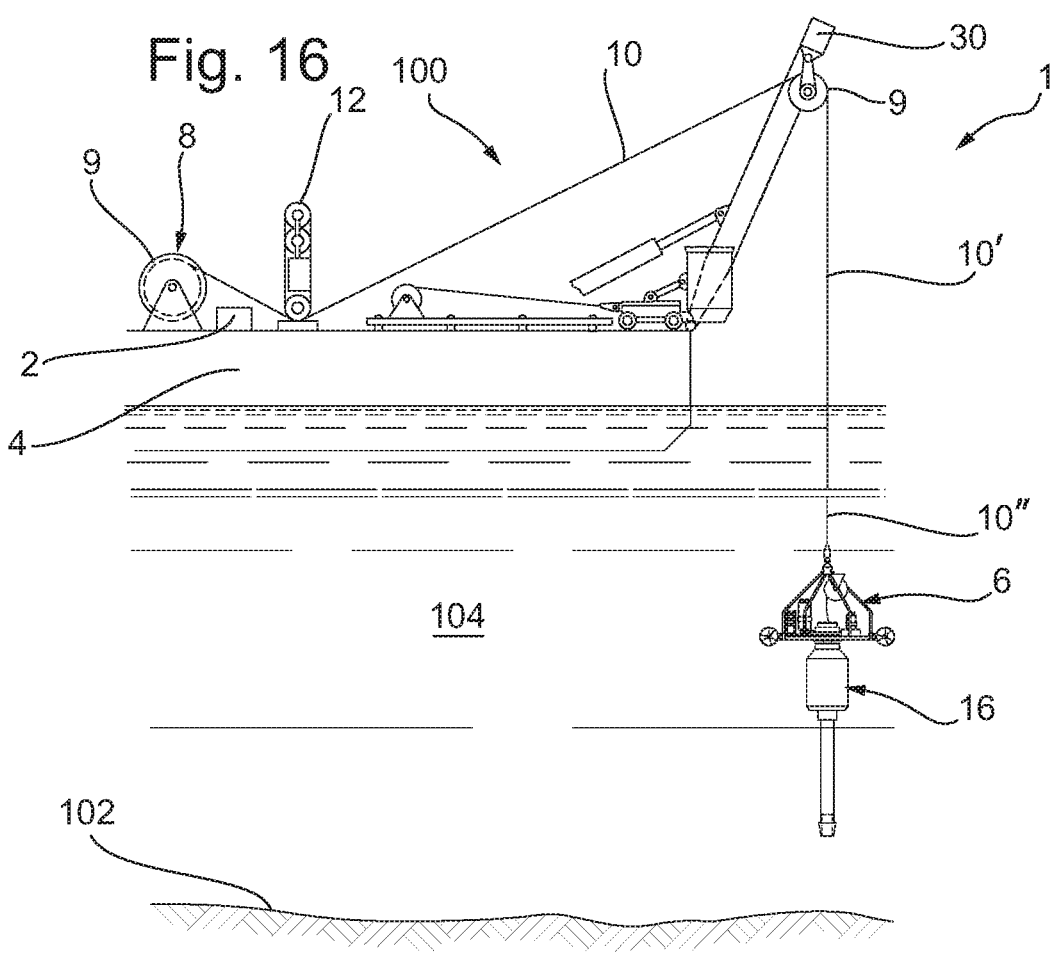

FIGS. 15 and 16 show another embodiment of the system 100 comprising another embodiment of the pin point corer 1. In principle, the system is similar to the system explained before, also comprising a vessel 4, a lifting and lowering device 8 having a main winch 9 and optionally a depth stabilizer 12. Further, an A-frame 30 or similar holding and swivelling device with its respective assemblies is provided. For redundancy reasons to the before-mentioned explanation is referred.

Figure 18:
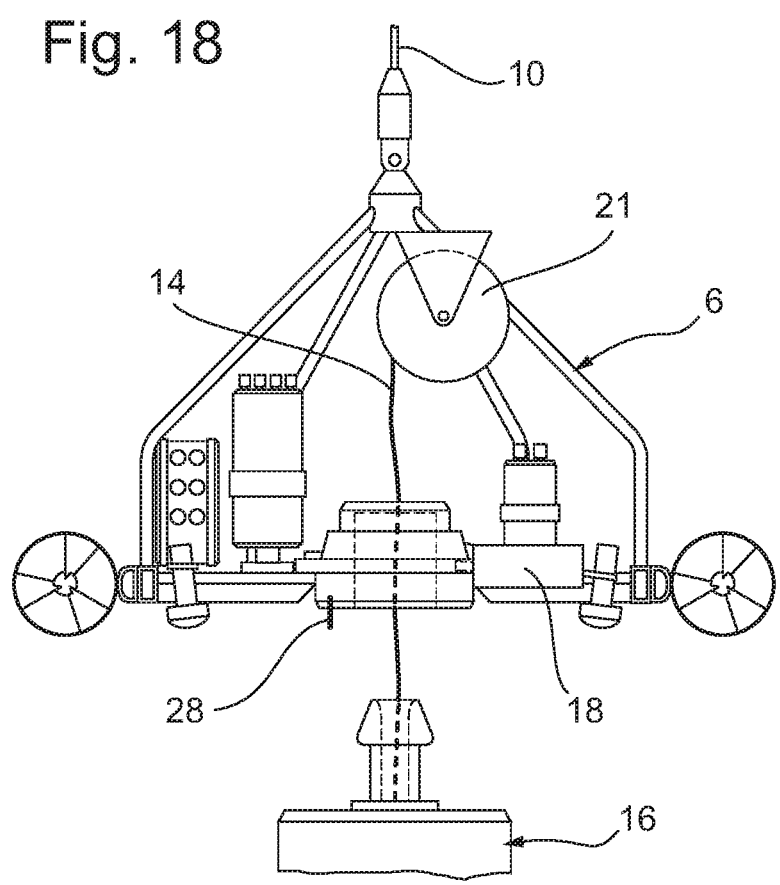

With regard to FIGS. 17 and 18 a further embodiment of the pin point corer 1 is shown again comprising a top lift unit 6 and a corer unit 16 attachable to the top lift unit 6 via a fixation unit 18. The fixation unit allows releasing of the corer unit 16 such that the corer unit can be driven into the seabed 102 (e.g. FIG. 19). It however also allows (re-)connecting a corer unit 16 to the top lift unit 6, e.g. when the corer unit 16 has been released before. This is going to be explained in the following in more detail.

The top lift unit 6 of the embodiment according to FIGS. 17 and 18 is constructed almost identical to the top lift unit 6 as explained before and especially with regard to the embodiment of FIG. 1. Further the top lift unit also comprises a winch 21 or similar coiling unit.

With this embodiment the winch 21 is attached to the top lift unit 6. The winch 21 provides a respective length of the corer wire 14 which can be spooled out when the corer unit 6 is released from the top lift unit 6. This arrangement is shown with FIGS. 17 and 18. The length of the corer wire 14 is optionally provided slightly longer than resulting from the free fall height required for driving the corer unit 6 to the seabed 102.

As can be seen with FIGS. 17 and 18, the top lift unit 6 also comprises a position indicator 28 indicating the position of the corer unit 16 relative to the top lift unit 6. In a special embodiment, the position indicator 28 indicates whether the corer unit 6 is in the attached position at the top lift unit 6 or not. In general, the position indicator may be a sensor of the positioning unit 20. Also with this position indicator distance measurement, movement measurement etc. may be possible, dependent on the embodiment of the position indicator.

As shown with FIG. 19, after reaching the desired collecting position and especially at the corer release position, e.g. having a desired free fall height $h_f$ for the corer unit 16, i.e. the corer unit 16 is released from the top lift unit 6 thereby falling in direction of the seabed 102.

After releasing the corer unit 16 the corer nozzle 17 is driven into the layers of the seabed 102 thereby collecting samples. For preventing that the corer wire 14 connecting the top lift unit 6 and the corer unit 16 is being bent and twisted, optionally a swivel joint is provided and optionally provided at the winch 15, as shown with FIG. 20.

Preparations for pulling the corer unit out of the seabed 102 are shown with FIG. 21-24.

For recovering the corer unit 16 with this embodiment, the winch 21 is activated thereby pulling the top lift unit 6 over and in direction to the corer unit 16 as can be seen with FIGS. 21 to 24. Here it may probably be necessary to release the cable 10 especially by activating the lifting and lowering device 8 on the vessel 4 or the depth stabilizer 12. By use of the position indicator 28 (see FIG. 21) positioning of the corer unit 16 with regard to the top lift unit 6 is controlled. Optionally, it may be provided that as soon as the position indicator indicates that the corer unit 16 is in an attachment position, the fixation unit 18 may be activated to attach and especially lock the corer unit 16 to the top lift unit 6.

With other words, with the embodiment shown the corer wire is optionally attached to the winch 15 which is arranged such that the corer wire 14 can be spooled out when the corer unit 16 is released from the top lift unit 6. Further, it may hold, that the corer wirer 14 and the winch 15 are arranged such that the top lift unit 6 can be pulled to the corer unit 16, e.g. when the corer unit is driven into the layers of the seabed 102 and/or that the winch and the corer wire are arranged such that the top lift unit 6 can be pulled to the corer wire unit 16 to engage and especially re-engage with the top lift unit by use of the fixation unit 18.

As soon as the corer unit 16 is attached to the top lift unit 6 the two units can be pulled in direction to the vessel 4 thereby pulling the corer unit out of the seabed 102.

Recovery of the water parts of the pin point corer 1 and its respective top lift unit 6 and corer unit 16 is shown with FIGS. 25 and 26.

As the corer unit 16 is already attached to the top lift unit 6, the water parts of the pin point corer can be at least temporarily secured to the bucket 36 and moved to the vessel by the trolley 34. Optionally, it is possible to detach the top lift unit 6 from the corer unit 16 while the corer unit 16 is secured to the bucket 36 for storing the two units individually on the vessel 4.

FIG. 27 represents a schematic visualization of an embodiment of the pin point corer 1 showing respective assemblies and modules provided.

The same applies for FIG. 28 showing an embodiment of the top lift unit and its possible assemblies and modules.

In the foregoing specification, the invention has been described with reference to a specific embodiment of the invention. It will, however, be evident that various modifications and changes may be made therein without departing from the broader spirit and scope of the invention as set forth in the appended claims. It has to be mentioned that all the features mentioned and especially the features mentioned in the claims could be provided with an embodiment of the invention in combination or on their own. The combination of features as brought forward with the above embodiments is not necessarily required.

However, other modifications, variations and alternatives are also possible. The specifications, drawings and examples are, accordingly, to be regarded in an illustrative rather than in a restrictive sense.

In the claims, any reference signs placed between parentheses shall not be construed as limiting the claim. The mere fact that certain measures are recited in mutually different claims does not indicate that a combination of these measures cannot be used to advantage.

Finally, the above-discussion is intended to be merely illustrative of the present systems and/or methods and should not be construed as limiting the appended claims to any particular embodiment or group of embodiments.

REFERENCE SIGNS 1 pin point corer
2 control unit
4 vessel
6 top lift unit
8 lifting and lowering unit
9 winch
10 cable
11 wire
12 depth stabilizer
13 piston
14 corer wire
15 winch
16 corer unit
17 corer nozzle
18 fixation unit
19 corer weight
20 positioning unit
21 winch
22 Depth-, acceleration-, moving-, positioning-sensor, CTB
24 camera
26 thruster
28 position indicator
30 A-frame
32 hydraulic activator
34 trolley
36 bucket
38 sub winch
40 battery pack/power supply
42 pear socket
44 swivel joint
100 system
102 seabed
104 sea
$h_f$ freefall height

The invention claimed is:

1. A device for collecting samples from a bed of a waterbody, the device comprising:
a control unit to be positioned in a remote position;
a top lift unit attached to a lifting and lowering unit of a vessel via a cable, such that the top lift unit can be lifted and lowered relative to the bed of the waterbody;
a corer unit releasable attached to the top lift unit by a fixation unit and arranged for being at least partly driven into layers of the bed of the waterbody to collect the samples from the bed, when released from the top lift unit; and
a depth stabilizer configured to keep the corer unit and top lift unit stable in a vertical direction when they are attached and to level the top lift unit after the corer unit is released from the top lift unit,
wherein the top lift unit comprises a positioning unit bi-directionally communicating with the control unit for controlling the position of the corer unit.

2. The device according to claim 1, wherein the corer unit is a free-fall gravity corer unit arranged for being at least partly driven by dead load of the corer unit into layers of the bed of the waterbody and to collect samples from there, when released from the top lift unit.

3. The device according to claim 1, wherein the positioning unit comprises at least one sensor of a group comprising a depth sensor, a motion sensor, an acceleration sensor, a positioning sensor, a camera for environment monitoring, the position unit being arranged for sending sensor data received from the sensor to the control unit.

4. The device according to claim 1, wherein the positioning unit further comprises at least one thruster for at least horizontally positioning the top lift unit.

5. The device according to claim 1, wherein the fixation unit is controllable by the control unit.

6. The device according to claim 1, wherein the fixation unit comprises an actuator for release the corer unit attached to the top lift unit.

7. The device according to claim 1, wherein the fixation unit is arranged for engaging with the corer unit.

8. The device according to claim 7, wherein the fixation unit is arranged to re-attach a released corer unit to the top lift.

9. The device according to claim 1, wherein the corer unit is connected to the top lift unit via a corer wire.

10. The device according to claim 9, wherein in that the corer wire is arranged such that the corer unit can be pulled out of the bed of the waterbody by pulling at the corer wire.

11. The device according to claim 9, wherein the corer wire is attached to a winch arranged such that the corer wire can be spooled out when the corer unit is released from the top lift unit and arranged such that the top lift unit can be pulled to the corer unit when the corer unit) is driven into the layers of the bed of a waterbody and arranged such that the top lift unit can be pulled to the corer unit to engage with the top lift unit by use of the fixation unit.

12. The device of claim 1, wherein the cable is an umbilical wire.

13. A system for collecting samples from a bed of a waterbody comprising: a vessel, comprising a lifting an lowering unit having a cable attached to a device; and
the device comprising:
a control unit to be positioned in a remote position;
a top lift unit attached to a lifting and lowering unit of a vessel via a cable, such that the top lift unit can be lifted and lowered relative to the bed of the waterbody;
a corer unit releasable attached to the top lift unit by a fixation unit and arranged for being at least partly driven into layers of the bed of the waterbody to collect the samples from the bed, when released from the top lift unit;
a depth stabilizer configured to keep the corer unit and top lift unit stable in a vertical direction when they are attached and to level the top lift unit after the corer unit is released from the top lift unit, and wherein the top lift unit comprises a positioning unit bi-directionally communicating with the control unit for controlling the position of the corer unit.

14. The system of claim 13, wherein the cable is an umbilical wire.

15. A method for collecting samples from a bed of a waterbody by use of a device, the method comprising:

lowering a top lift unit and a corer unit of the device in the waterbody by use of a lifting and lowering unit, the top lift unit is connected to via a cable, wherein the corer unit is attached to the top lift unit;

positioning the top lift unit in a desired corer release position in a vicinity of the bed of the waterbody by use of a positioning unit bi-directionally communicating with a control unit and keeping the corer unit and top lift unit stable in a vertical direction by using a depth stabilizer;

releasing the corer unit from the top lift unit by activating a release mechanism so that it is at least partly driven into layers of the bed of the waterbody while leveling the top lift unit after the corer unit is released from the top lift unit;

collecting samples from the layers of the bed of the waterbody; and pulling the corer unit out of the bed of the waterbody and lifting it back to a vessel.

16. The method according to claim 15, wherein the corer release position is a position providing a free-fall height down to the bed of the waterbody for the corer unit when it is released of 3-0.5 meters.

17. The method according to claim 15, further comprising:

pulling at the cable in such a way that the top lift unit is lifted thereby pulling at the corer wire; and pulling the corer unit out of the bed of a waterbody.

18. The method according to claim 15, wherein the corer wire is attached to a winch arranged such that the top lift unit can be pulled to the corer unit, the method further comprising:

pulling the top lift unit to the corer unit and optionally thereby releasing the cable;

attaching the corer unit to the top lift unit; and pulling at the cable in such a way that the top lift unit is lifted, thereby pulling the corer unit out of the bed of a waterbody.

19. The method of claim 15, wherein the cable is an umbilical wire.

* * * * *